(12) United States Patent
Kariya

(10) Patent No.: US 12,454,239 B2
(45) Date of Patent: Oct. 28, 2025

(54) CURTAIN SHIELD AIRBAG DEVICE

(71) Applicant: TOYOTA JIDOSHA KABUSHIKI KAISHA, Toyota (JP)

(72) Inventor: Kennosuke Kariya, Kakamigahara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/924,195

(22) Filed: Oct. 23, 2024

(65) Prior Publication Data

US 2025/0242776 A1 Jul. 31, 2025

(30) Foreign Application Priority Data

Jan. 30, 2024 (JP) ................................ 2024-011618

(51) Int. Cl.
*B60R 21/213* (2011.01)
*B60R 21/231* (2011.01)
*B60R 21/232* (2011.01)

(52) U.S. Cl.
CPC ...... *B60R 21/213* (2013.01); *B60R 21/23138* (2013.01); *B60R 21/232* (2013.01)

(58) Field of Classification Search
CPC ............ B60R 21/213; B60R 21/23138; B60R 21/232
See application file for complete search history.

(56) References Cited

U.S. PATENT DOCUMENTS

| | | | |
|---|---|---|---|
| 6,371,512 B1* | 4/2002 | Asano | B60R 21/237 280/730.2 |
| 6,435,543 B1* | 8/2002 | Magoteaux | B60R 21/2338 280/730.2 |
| 10,000,178 B2* | 6/2018 | Fukawatase | B60R 21/232 |
| 10,442,387 B2* | 10/2019 | Yamane | B60R 21/2338 |
| 10,836,342 B2* | 11/2020 | Hayashi | B60R 21/213 |
| 11,155,231 B2* | 10/2021 | Ohno | B60R 21/232 |

FOREIGN PATENT DOCUMENTS

JP 2017-100682 A 6/2017

* cited by examiner

*Primary Examiner* — Jason D Shanske
*Assistant Examiner* — Joselynn Y Sliteris
(74) *Attorney, Agent, or Firm* — SoraIP, Inc.

(57) ABSTRACT

A curtain shield airbag device includes a curtain shield airbag having a front lower sub-chamber portion located on a side of a front seat of a vehicle in an inflated and deployed state and a rear lower sub-chamber portion located on a side of a rear seat of the vehicle in the inflated and deployed state, and includes a distribution unit having a front path for supplying gas to the front lower sub-chamber portion and a rear path for supplying gas to the rear lower sub-chamber portion, and the distribution unit is disposed near an arrangement position of a shoulder belt anchor of the front seat in the inflated and deployed state of the curtain shield airbag.

9 Claims, 3 Drawing Sheets

CURTAIN SHIELD AIRBAG DEVICE

CROSS-REFERENCE TO RELATED APPLICATION

This application claims priority to Japanese Patent Application No. 2024-011618 filed on Jan. 30, 2024, incorporated herein by reference in its entirety.

BACKGROUND

1. Technical Field

The present disclosure relates to a curtain shield airbag device mounted on a vehicle. In particular, the present disclosure relates to measures for optimizing inflation and deployment operation of a curtain shield airbag.

2. Description of Related Art

Conventionally, as disclosed in Japanese Unexamined Patent Application Publication No. 2017-100682 (JP 2017-100682 A), for example, there is known a curtain shield airbag device that suppresses contact between the head portion of an occupant and side window glass or the like by inflating and deploying at a side of the occupant (on the outer side in the vehicle width direction with respect to the occupant) during a side collision or the like of the vehicle.

SUMMARY

A side collision and an offset front collision are known as the form of collisions of vehicles, and tests for these collisions are performed at the development stage of the vehicles.

The behavior of the occupant (in particular, the behavior of the head portion) in the vehicle cabin is different between the side collision and the offset front collision, and thus the inventor of the present disclosure is developing an improved shape of the curtain shield airbag corresponding to such behavior.

Specifically, the characteristic behavior of the occupant caused when a side collision load is input to a front side door at the time of a side collision of the vehicle is as follows, for example. That is, the position of the waist of the occupant in the front seat on the side to which the side collision load is input is moved toward the center side in the vehicle width direction, and accordingly, the upper body of the occupant is inclined such that the head portion is moved toward the outer side in the vehicle width direction. Therefore, there is a concern that the head portion of the occupant in the front seat comes into contact with the lower portion of the side window glass or the door trim at the time of the side collision of the vehicle. In view of this, the inventor of the present disclosure is developing an improved shape in which the front portion (a portion located at a side of the occupant in the front seat) of the curtain shield airbag is extended downward. Hereinafter, this extended portion will be referred to as a side collision front seat occupant protection portion.

On the other hand, the characteristic behavior of the occupant at the time of the offset front collision of the vehicle includes movement of the head portion of the occupant in the rear seat on the offset side of the front collision load toward the front side of the vehicle and toward the outer side in the vehicle width direction. Therefore, there is a concern that the head portion of the occupant in the rear seat comes into contact with the lower portion of the side window glass or the door trim (that is, the head portion of the occupant in the rear seat passes under the curtain shield airbag) at the time of the offset front collision of the vehicle. In view of this, the inventor of the present disclosure is developing an improved shape in which the rear portion (a portion located at a side of the occupant in the rear seat) of the curtain shield airbag is also extended downward. Hereinafter, this portion will be referred to as a front collision rear seat occupant protection portion.

When the shape of the curtain shield airbag is improved in this manner, it is necessary to feed a gas to each of the side collision front seat occupant protection portion and the front collision rear seat occupant protection portion when the vehicle collides. Therefore, there are an increased number of branch portions (such as a branch portion to feed a gas to each of the side collision front seat occupant protection portion and the front collision rear seat occupant protection portion) inside the curtain shield airbag. As a result, there is a concern that inflation and deployment of the curtain shield airbag (inflation and deployment to obtain a sufficient occupant protection function) is delayed.

In order to accelerate the time of completion of inflation and deployment of the curtain shield airbag (reduce the time required for inflation and deployment to obtain a sufficient occupant protection function), the output of an inflator that supplies a gas to the inside of the curtain shield airbag is increased, or the number of inflators is increased. However, when the output of the inflator is increased, the internal pressure of the curtain shield airbag during inflation and deployment is increased. As a result, there is a possibility that a hole is opened in the curtain shield airbag (hole opening due to so-called stitch deviation is caused). When the number of inflators is increased, the cost of the curtain shield airbag device is increased. In this manner, it has not been possible in the related art to achieve a curtain shield airbag device capable of providing good protection corresponding to the behavior of each of the occupant in the front seat and the occupant in the rear seat for each of the side collision and the offset front collision of the vehicle, without improving the inflator (without increasing the output or increasing the number).

The above issue is not necessarily peculiar to a curtain shield airbag device that includes a curtain shield airbag with the side collision front seat occupant protection portion and the front collision rear seat occupant protection portion (a curtain shield airbag with an increased number of branch portions as compared with common curtain shield airbags). The above issue may also occur in a curtain shield airbag device that includes a curtain shield airbag in a common shape.

The present disclosure provides a curtain shield airbag device capable of providing good protection to each of an occupant in the front seat and an occupant in the rear seat for each of a side collision and an offset front collision of a vehicle without improving an inflator.

An aspect of the present disclosure provides a curtain shield airbag device including:
 a curtain shield airbag to be inflated and deployed in each of a side collision and an offset front collision of a vehicle, the curtain shield airbag including a front seat occupant protection chamber portion to be located on a side of a front seat of the vehicle in an inflated and deployed state and a rear seat occupant protection chamber portion to be located on a side of a rear seat of the vehicle in an inflated and deployed state; and a distribution unit that includes a front path through which a gas is supplied to the front seat occupant protection chamber portion and a rear path through which a gas is supplied to the rear seat occupant protection chamber portion, in which the distribution unit is disposed near an arrangement position of a shoulder belt anchor for the front seat with the curtain shield airbag in an inflated and deployed state.

At the time of the offset front collision of the vehicle, the occupant in the front seat moves forward by the inertial force thereof, and accordingly, the shoulder belt is pulled in a direction toward the front side of the vehicle. That is, with the offset front collision, the extending direction of the shoulder belt starting from the arrangement position of the shoulder belt anchor varies toward the front side in the horizontal direction. In the present solution, the distribution unit (distribution unit that includes a front path through which a gas is supplied to the front seat occupant protection chamber portion and a rear path through which a gas is supplied to the rear seat occupant protection chamber portion) is disposed near the arrangement position of the shoulder belt anchor for the front seat. As a result, during the initial period of the offset front collision (the period in which the occupant in the front seat is moving forward), the shoulder belt, the extending direction of which has varied toward the front side in the horizontal direction, presses the curtain shield airbag in the direction of narrowing the front path of the distribution unit or the entrance portion of the front path. Therefore, during the initial period of the offset front collision, the gas flows preferentially to the rear path, making it possible to accelerate the time of completion of inflation and deployment of the rear seat occupant protection chamber portion. As described above, the characteristic behavior of the occupant at the time of the offset front collision of the vehicle includes movement of the head portion of the occupant in the rear seat toward the front side of the vehicle and toward the outer side in the vehicle width direction. According to this behavior, it is required to accelerate the time of completion of inflation and deployment of the rear seat occupant protection chamber portion. According to the present solution, it is possible to accelerate the time of completion of inflation and deployment of the rear seat occupant protection chamber portion at the time of the offset front collision of the vehicle, by effectively utilizing the movement of the shoulder belt.

At the time of the side collision of the vehicle, on the other hand, the occupant in the front seat does not move forward, and therefore the shoulder belt does not operate to narrow the front path of the distribution unit or the entrance portion of the front path. Therefore, the gas sufficiently flows toward the front path, making it possible to accelerate the time of completion of inflation and deployment of the front seat occupant protection chamber portion. As described above, the characteristic behavior of the occupant at the time of the side collision of the vehicle includes movement of the head portion of the occupant in the front seat toward the outer side in the vehicle width direction. According to this behavior, it is required to accelerate the time of completion of inflation and deployment of the front seat occupant protection chamber portion. According to the present solution, it is possible to accelerate the time of completion of inflation and deployment of the front seat occupant protection chamber portion at the time of the side collision of the vehicle.

In this manner, according to the present aspect, the mode of inflation and deployment of the curtain shield airbag can be made different by utilizing the difference in the movement of the shoulder belt between the time of the side collision and the time of the offset front collision of the vehicle. Accordingly, it is possible to provide good protection to each of the occupant in the front seat and the occupant in the rear seat for each of the side collision and the offset front collision of the vehicle without improving the inflator.

In addition, an entrance of the front path of the distribution unit may be disposed on a front side and a lower side of the vehicle with respect to the arrangement position of the shoulder belt anchor.

Accordingly, the following operation can be reliably obtained at the time of the offset front collision of the vehicle. That is, at the time of the offset front collision of the vehicle, the shoulder belt, the extending direction of which varies toward the front side in the horizontal direction, presses the curtain shield airbag so as to narrow the front path of the distribution unit or the entrance portion of the front path. That is, it is possible to reliably obtain operation to accelerate the time of completion of inflation and deployment of the rear seat occupant protection chamber portion, by limiting the amount of gas flowing into the front seat occupant protection chamber portion. This makes it possible to sufficiently accelerate the time of completion of inflation and deployment of the rear seat occupant protection chamber portion at the time of the offset front collision of the vehicle.

In addition, an entrance of the rear path of the distribution unit may be disposed on an upper side of the vehicle or a rear side of the vehicle with respect to the arrangement position of the shoulder belt anchor.

According to this configuration, at the time of the offset front collision of the vehicle, the shoulder belt, the extending direction of which varies toward the front side in the horizontal direction, does not press the rear path of the distribution unit (does not press the periphery of the rear path in the curtain shield airbag). Thus, the entrance portion of the rear path is not narrowed. Therefore, it is possible to reliably obtain a situation in which the gas flows preferentially to the rear path, making it possible to accelerate the time of completion of inflation and deployment of the rear seat occupant protection chamber portion.

In a specific configuration of the curtain shield airbag, in addition, the front seat occupant protection chamber portion may be located on a front side and a lower side of the vehicle with respect to the distribution unit, and the rear seat occupant protection chamber portion may be located on a rear side and a lower side of the vehicle with respect to the distribution unit.

As described above, the characteristic behavior of the occupant caused when a side collision load is input to a front side door at the time of a side collision of the vehicle includes the upper body of the occupant being inclined such that the head portion is moved toward the outer side in the vehicle width direction. Therefore, there is a concern that the head portion of the occupant in the front seat comes into contact with the lower portion of the side window glass or the door trim at the time of the side collision of the vehicle. According to the present solution, the front seat occupant protection chamber portion is located on the front side and the lower side of the vehicle with respect to the distribution unit. Thus, it is possible to provide good protection for the head portion of the occupant in the front seat moving as described above with the front seat occupant protection chamber portion in the inflated and deployed state.

On the other hand, as described above, the characteristic behavior of the occupant at the time of the offset front collision of the vehicle includes movement of the head portion of the occupant in the rear seat on the offset side of the front collision load toward the front side of the vehicle and toward the outer side in the vehicle width direction. Therefore, there is a possibility that the head portion of the occupant in the rear seat comes into contact with the lower portion of the side window glass or the door trim (that is, the head portion of the occupant in the rear seat passes under the curtain shield airbag) at the time of the offset front collision of the vehicle. According to the present solution, the rear seat occupant protection chamber portion is located on the rear side and the lower side of the vehicle with respect to the distribution unit. As a result, it is possible to provide good protection for the head portion of the occupant in the front seat moving as described above with the front seat occupant protection chamber portion in the inflated and deployed state.

In the present disclosure, the distribution unit including a front path through which a gas is supplied to the front seat occupant protection chamber portion and a rear path through which a gas is supplied to the rear seat occupant protection chamber portion is disposed near the arrangement position of the shoulder belt anchor for the front seat with the curtain shield airbag in the inflated and deployed state. Accordingly, the mode of inflation and deployment of the curtain shield airbag can be made different by utilizing the difference in the movement of the shoulder belt between the time of the side collision and the time of the offset front collision of the vehicle. Consequently, it is possible to provide good protection to each of the occupant in the front seat and the occupant in the rear seat for each of the side collision and the offset front collision of the vehicle without improving the inflator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
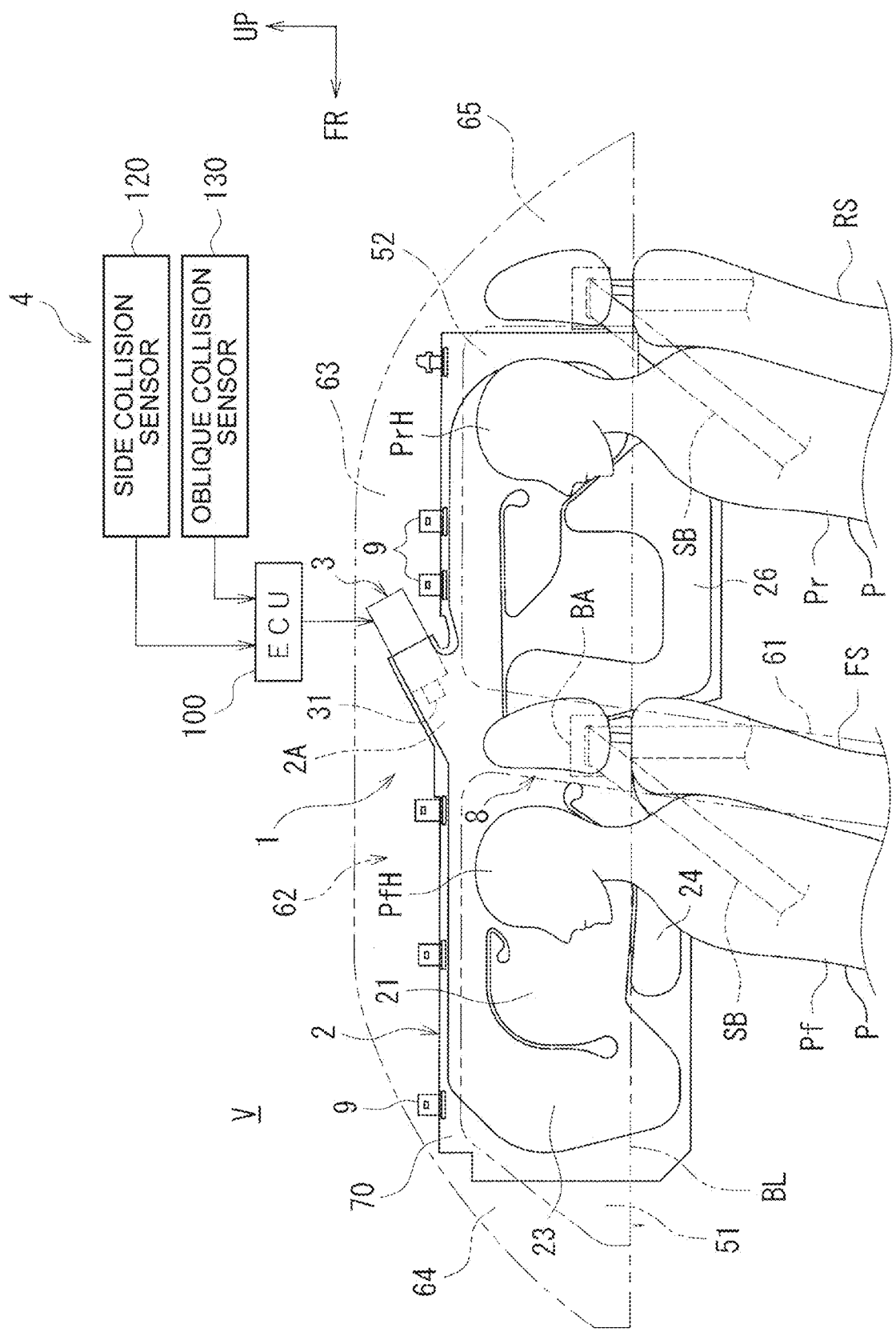
FIG. 1 is a schematic side view of a vehicle cabin showing a state in which a curtain shield airbag is inflated and deployed in an embodiment.

Hereinafter, an embodiment of the present disclosure will be described with reference to the drawings.
Configuration of Curtain Shield Airbag Device FIG. 1 is a schematic side view of a vehicle cabin showing a curtain shield airbag device (hereinafter, also referred to as a CSA device) 1 according to the present embodiment in which a curtain shield airbag (hereinafter, also referred to as a CSA) 2 is inflated and deployed. In the present embodiment, for convenience of explanation, the arrow UP shown in the drawings is referred to as a vehicle upward direction, and the arrow FR is referred to as a vehicle forward direction. Therefore, in the following description, when the vertical and front-rear directions are described without special mention, the vertical and front-rear directions of the vehicle V are assumed to be indicated.

Further, in the present embodiment, a sedan-type vehicle V is exemplified, and an occupant P is seated on a vehicle seat FS serving as a front seat and a vehicle seat RS serving as a rear seat. Note that the occupants P are dummies for crash tests, and the dummies are AM50 (50th percentile of American adult men) of World Side Impact Dummy (WorldSID), for example.

Each occupant P is seated on each vehicle seat FS, RS in a seating manner defined by the side impact test method, and is restrained to each vehicle seat FS, RS by a seat belt SB of a three-point seat belt device. In the following description, the occupant P seated on the vehicle seat FS of the front seat (hereinafter, sometimes simply referred to as the front seat) is referred to as a "front seat occupant Pf". In addition, in the following description, the occupant P seated on the vehicle seat (hereinafter, sometimes simply referred to as the rear seat) RS of the rear seat may be referred to as a "rear seat occupant Pr".

As shown in FIG. 1, CSA device 1 includes a CSA 2 that inflates and deploys when gas is supplied, an inflator 3 that supplies gas to the inside of CSA 2, and a control device 4 that controls the operation of the inflator 3.

CSA 2 and the inflator 3 are provided on both left and right sides of the vehicle V, respectively. That is, CSA device 1 includes a pair of left and right CSA 2 and a pair of left and right inflators 3. In FIG. 1, CSA device 1 provided on the right side of the vehicle V is illustrated, and in the following, CSA device 1 on the right side will be exemplified.

CSA 2 is configured to expand and deploy in a curtain shape along the front side glass 51, the substantially upper half of the center pillar (hereinafter referred to as "B pillar") 61, and the rear side glass 52. Therefore, the longitudinal direction of CSA 2 is the longitudinal direction. The specific configuration of CSA 2 will be described in detail later.

The inflator 3 is a gas generating device for instantaneously supplying gas to the inside of CSA 2, and is disposed in the vicinity of a substantially intermediate portion in the longitudinal direction of CSA 2 (the vicinity of the B-pillar 61). Specifically, the inflator 3 is formed in a substantially cylindrical shape, and is fixed to the roof side rail 63 constituting the roof side portion 62 via a bracket (not shown) so that the axial center portion thereof is disposed substantially along the front-rear direction.

The gas-ejecting portion 31 provided at one axial end portion (in this case, the front end portion) of the inflator 3 is connected by being inserted from the rear side into a connecting passage 2A formed at a substantially intermediate portion in the longitudinal direction of CSA 2. As a result, the inside of the gas-ejecting portion 31 and the inside of CSA 2 can communicate with each other. Incidentally, the outer peripheral surface of the gas-ejecting portion 31 and the inner peripheral surface of the connecting passage 2A are in close contact with each other, so that gas does not leak from between them.

As shown in FIG. 1, the left and right inflators 3 are electrically connected to an airbag electronic control unit (ECU) 100 provided in the vehicle V. The airbag ECU 100 is electrically connected to the side collision sensor 120 and the oblique collision sensor 130 provided in the vehicle V, respectively.

The side collision sensor 120 is configured to detect or predict a side collision of the vehicle V and output a side collision signal to the airbag ECU 100. The oblique collision sensor 130 is configured to detect or predict an oblique collision (hereinafter, sometimes referred to as an offset-front collision) of the vehicle V and to output an oblique collision signal to the airbag ECU 100.

The airbag ECU 100 is configured to operate the inflator 3 on the side collision side (side collision side) or the offset front collision side (near side) when a side collision signal or a slope collision signal is inputted. As a result, CSA 2 on the near side is inflated and deployed by being supplied with gases. In addition, the inflators 3 on both sides may be operated to inflate and deploy the respective CSA 2.

The airbag ECU 100, the side collision sensor 120, and the oblique collision sensor 130 constitute a control device 4.

CSA 2 are bag-woven together with a method of One Piece Woven (abbreviated as OPW), for example. In OPW method, a jacquard loom is used to form a non-sewn bag by weaving two base fabrics at the same time while weaving the required portions in multiple weaves.

CSA 2 manufacturing process is not limited to OPW method described above. For example, CSA 2 may be manufactured by sewing one or a plurality of base fabrics formed by cutting out a polyamide-based or polyester-based fabric material in a bag shape.

CSA 2 manufactured in this manner is folded in a roll shape having a substantially front-rear direction as an axial direction and formed in an elongated shape, and is housed in the roof side portion 62 together with the inflator 3.

Figure 2:
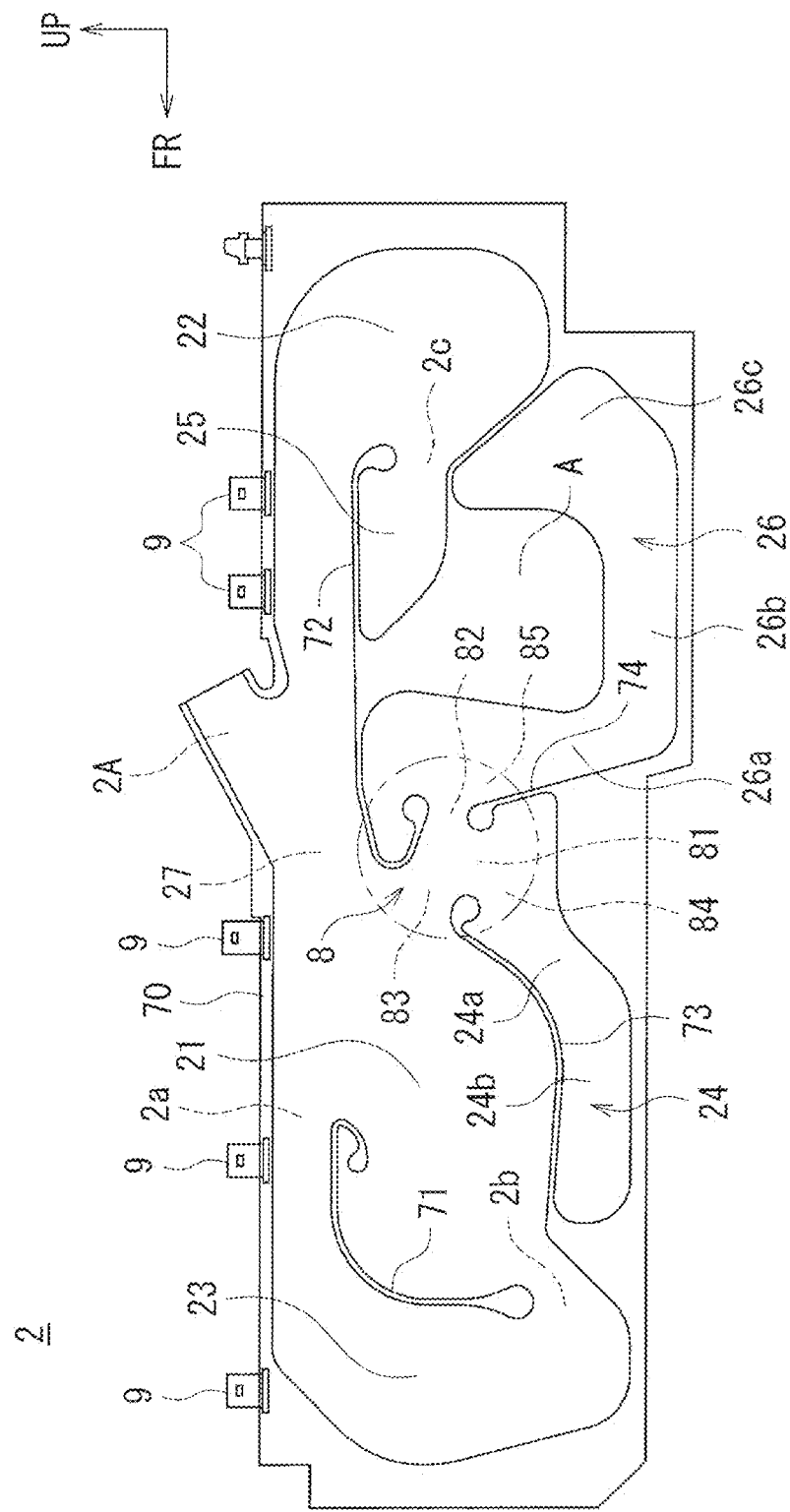
FIG. 2 is a side view illustrating a state in which the curtain shield airbag is inflated and deployed in the embodiment.

FIG. 2 is a diagram illustrating CSA 2 of CSA device 1 according to the present embodiment in an expanded and deployed condition. As shown in FIG. 2, CSA 2 includes a front-seat main chamber portion 21 and a rear-seat main chamber portion 22 as main chamber portions, and a front-seat front sub-chamber portion 23 as a sub-chamber portion provided on the front side of the front-seat main chamber portion 21. CSA 2 further includes a front-seat lower sub-chamber portion (which is an exemplary front-seat occupant protective chamber portion of the present disclosure) 24 as a sub-chamber portion provided on the lower side of the front-seat main chamber portion 21. CSA 2 further includes a rear-seat front sub-chamber portion 25 as a sub-chamber portion provided on the front side of the rear-seat main chamber portion 22. CSA 2 further includes a rear-seat lower sub-chamber portion (an example of the rear seat occupant protection chamber portion of the present disclosure) 26 as a sub-chamber portion provided below the rear-seat main chamber portion 22 and the rear-seat front sub-chamber portion 25.

In addition, CSA 2 includes a gas-supply passage 27 that allows the front-seat main chamber portion 21 and the rear-seat main chamber portion 22 to communicate with each other. The gas-supply passage 27 is formed at an upper portion of CSA 2 at a substantially intermediate portion in the longitudinal direction, and connects the upper portion of the front-seat main chamber portion 21 and the upper portion of the rear-seat main chamber portion 22 to each other. The above-described connecting passage 2A extends upward and rearward from an upper end portion of the gas-supply passage 27.

Further, an outer peripheral non-expansion portion 70 is formed at an outer peripheral edge portion of CSA 2. That is, the outer peripheral non-expansion portion 70, the upper edge portion of CSA 2, the lower edge portion, continuously constitutes a leading edge portion and a trailing edge portion.

The front-seat main chamber portion 21 and the front-seat front sub-chamber portion 23 are partitioned by a first non-expansion portion 71. The front-seat main chamber portion 21 and the front-seat front sub-chamber portion 23 communicate with each other by a communication portion 2a, 2b provided on both upper and lower sides of the first non-expansion portion 71.

The rear-seat main chamber portion 22 and the rear-seat front sub-chamber portion 25 are partitioned by the second non-expansion portion 72. The rear-seat main chamber portion 22 and the rear-seat front sub-chamber portion 25 communicate with each other by a communication portion 2c provided on the rear end side of the second non-expansion portion 72.

The front-seat main chamber portion 21 and the front-seat lower sub-chamber portion 24 are partitioned by a third non-expansion portion 73. The third non-expansion portion 73 has a shape in which a front end portion thereof is connected to the outer peripheral non-expansion portion 70 and is inclined upward toward the rear of the vehicle.

The front-seat lower sub-chamber portion 24 and the rear-seat lower sub-chamber portion 26 are partitioned by a fourth non-expansion portion 74. The fourth non-expansion portion 74 has a shape in which a lower end portion thereof is connected to the outer peripheral non-expansion portion 70 and extends in a substantially vertical direction.

Further, the lower end position of CSA 2 is set lower than the door belt line BL passing through the lower edge portion of the window frame (the upper edge portion of the door trim of the front side door) (see FIG. 1). That is, CSA 2 in the present embodiment extends downward, and the lower portion of the front-seat front sub-chamber portion 23, the front-seat lower sub-chamber portion 24, and the rear seat lower sub-chamber portion 26 are disposed in the extended portion. Consequently, CSA 2 is designed to protect the head PfH, PrH even when the head PfH, PrH of the occupant P moves downward during a side collision or an offset-front collision of the vehicle V.

As shown in FIG. 2, the front-seat lower sub-chamber portion 24 and the rear-seat lower sub-chamber portion 26 communicate with the gas-supply passage 27 via the distribution unit 8. In FIG. 2, a region surrounded by an imaginary line corresponds to the distribution unit 8. The distribution unit 8 is a portion configured as a flow path branch portion for distributing and supplying the gas ejected from the inflator 3 and reaching the gas-supply passage 27 to the front-seat lower sub-chamber portion 24 and the rear seat lower sub-chamber portion 26, respectively.

The distribution unit 8 has a lower opening (inlet of the front path in the present disclosure) 81 which is open (communicated) toward the front-seat lower sub-chamber portion 24, and a rear opening (inlet of the rear path in the present disclosure) 82 which is open (communicated) toward the rear-seat lower sub-chamber portion 26. The distribution unit 8 further has a front opening 83 that opens (communicates) toward the gas-supply passage 27.

The lower opening 81 is configured as a space between the upper end portion of the third non-expansion portion 73 and the upper end portion of the fourth non-inflated portion 74. Since the upper end portion of the third non-expansion portion 73 and the upper end portion of the fourth non-expansion portion 74 face each other in the substantially vehicle front-rear direction, the lower opening 81 is an opening extending substantially in the vehicle front-rear direction.

The rear opening 82 is configured as a space between a front end portion of the second non-expansion portion 72

(actually, a rear end portion of a portion bent in a U-shape) and an upper end portion of the fourth non-inflated portion 74. Since the front end portion of the second non-expansion portion 72 and the upper end portion of the fourth non-expansion portion 74 are opposed to each other in the substantially vertical direction, the rear opening 82 is an opening extending in the substantially vertical direction.

The front opening 83 is configured as a space between the upper end portion of the third non-expansion portion 73 and the front end portion of the second non-expansion portion 72 (actually, the front end portion of the portion bent in a U-shape). Since the upper end portion of the third non-expansion portion 73 and the front end portion of the second non-expansion portion 72 are opposed to each other in a direction having a predetermined inclination angle with respect to the vertical direction (a direction inclined upward toward the vehicle rear side), the front opening 83 is an opening extending over the inclination direction.

Further, the distribution unit 8 extends from the lower opening 81 to the front-seat lower sub-chamber portion 24, and loosens the front passage 84 communicating with the internal space of the front-seat lower sub-chamber portion 24. The distribution unit 8 also has a rear path 85 extending from the rear opening 82 to the rear-seat lower sub-chamber portion 26 and communicating with the interior space of the rear-seat lower sub-chamber portion 26.

In addition, the opening area of the lower opening 81 and the opening area of the rear opening 82 (the opening area in the inflated and deployed condition of CSA 2) is set larger in the opening area of the lower opening 81 than in the opening area of the rear opening 82. That is, the distance between the upper end portion of the third non-expansion portion 73 and the upper end portion of the fourth non-expansion portion 74 is set longer than the distance between the front end portion of the second non-expansion portion 72 and the upper end portion of the fourth non-expansion portion 74. For example, the opening area of the lower opening 81 is set to about twice the opening area of the rear opening 82. The ratio of the opening area is not limited to this, and is appropriately set.

Figure 3:
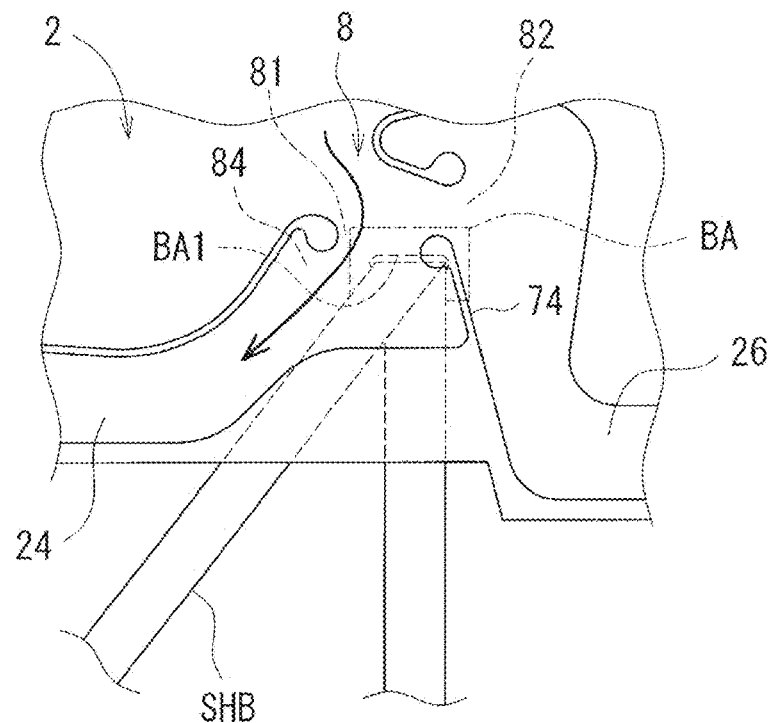
FIG. 3 is an enlarged view of a main part of the curtain shield airbag and the shoulder belt at the time of side collision of the vehicle according to the embodiment.
Figure 4:
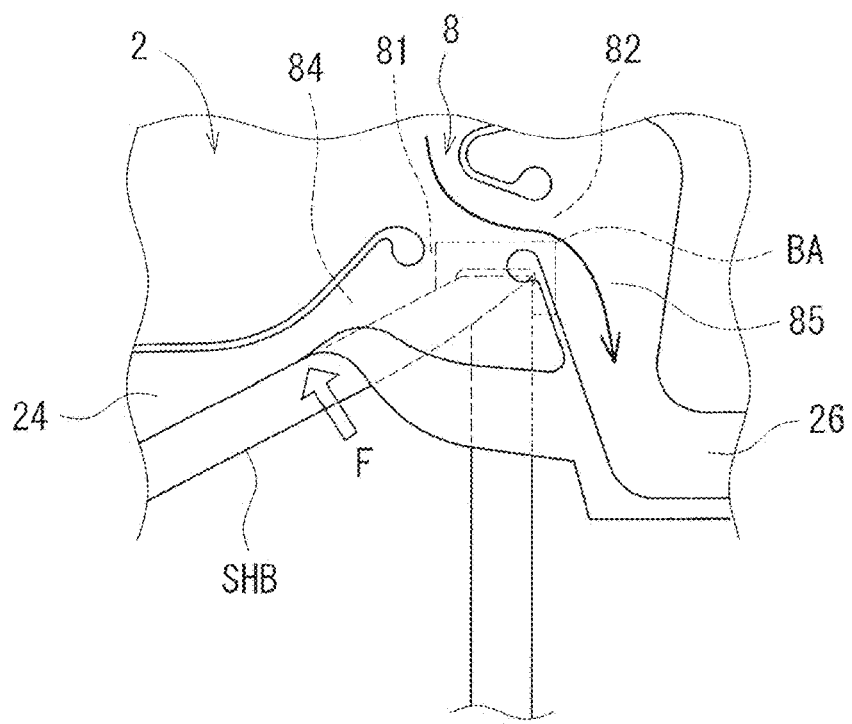
FIG. 4 is an enlarged view showing a state of the curtain shield airbag and the shoulder belt at the time of the offset front collision of the vehicle according to the embodiment.

Further, specifically as the arrangement position of the distribution unit 8, the distribution unit 8, as shown in FIG. 1, in the expanded and deployed condition of CSA 2, is disposed in the vicinity of the arrangement position of the shoulder belt anchor BA of the front seat FS. More specifically, for example, as shown in FIG. 3, the arrangement position of the distribution unit 8 is set. That is, the distribution unit 8 is disposed such that the position of the belt insertion hole BA 1 of the shoulder belt anchor BA is located lower than the lower end position of the rear opening 82 (the position of the upper end portion of the fourth non-expansion portion 74) and on the front side. As a result of this arrangement position, a state as shown in FIG. 4 is possible. That is, consider a case where the shoulder belt SHB changes so that the extending direction starting from the position where the shoulder belt anchor BA is disposed is directed to the front side in the horizontal direction (a case where the shoulder belt SHB is in the attitude at the time of the offset front collision). This shoulder belt SHB does not interfere with the rear opening 82 or the rear path 85 and does not narrow these spaces. On the other hand, the shoulder belt SHB can interfere with the lower opening 81 or the front path 84 to narrow these spaces. The arrangement position of the distribution unit 8 is not limited to the above-described position as long as the position can create such a state.

The front-seat lower sub-chamber portion 24 in the inflated and deployed condition includes an inclined portion 24a and a horizontal portion 24b. The inclined portion 24a continues to the front path 84 and extends obliquely downward toward the front of the vehicle below the front-seat main chamber portion 21. The horizontal portion 24b continues to the front end of the inclined portion 24a and extends substantially horizontally toward the front of the vehicle under the front-seat main chamber portion 21. The position of the vehicle front-side end portion of the front-seat lower sub-chamber portion 24 in the horizontal-portion 24b is set at a position slightly behind the vehicle rear than the position of the lower end of the first non-expansion portion 71.

Further, the rear-seat lower sub-chamber portion 26 in the inflated and deployed condition includes a first vertical portion 26a, a horizontal portion 26b, and a second vertical portion 26c. The first vertical portion 26a continues to the rear path 85 and extends downward. The horizontal portion 26b continues to the lower end of the first vertical portion 26a and extends substantially horizontally toward the rear of the vehicle. The second vertical portion 26c continues to the rear end of the horizontal portion 26b and extends upward toward the rear-seat main chamber portion 22 and the rear-seat front sub-chamber portion 25. As a result of such a configuration of the rear-seat lower sub-chamber portion 26, the region (region A in FIG. 2) between the rear-seat lower sub-chamber portion 26, the rear-seat front sub-chamber portion 25, and the gas-supply passage 27 is a non-inflated portion to which gas is not supplied. When CSA 2 is inflated and deployed, the rear-seat lower sub-chamber portion 26, the rear-seat front sub-chamber portion 25, and the gas-supply passage 27 are inflated, so that a high tension (a force that pulls the non-inflated portion outward) acts on the entire non-inflated portion (region A) surrounded by the rear-seat lower sub-chamber portion. As a result, even if the head of the occupant in the rear seat moves toward the non-inflated portion, the head can be received to prevent the head from coming into contact with the rear side glass 52.

Further, a plurality of fixing tabs 9, 9 . . . extend upward at the upper edge of CSA 2. Each of the fixing tabs 9, 9 . . . is located at a roof side portion 62, which is an upper end portion of a side portion of the vehicle cabin, and is fixed to the roof side rail 63. The roof side rail 63 includes a rear end portion (a boundary portion between the front pillar 64 and the roof side rail 63) of the front pillar 64 (see FIG. 1) and a front end portion (a boundary portion between the rear pillar 65 and the roof side rail 63) of the rear pillar 65. The front pillar is hereinafter referred to as "A pillar". The rear pillar is hereinafter referred to as "C pillar". That is, the fixing tabs 9, 9, . . . are fixed to the roof side rails 63 extending from the rear end portion of the A-pillar 64 to the front end portion of the C-pillar 65 by fasteners such as clips, bolts, and nuts (not shown).

In CSA device 1 having such a configuration, when the inflator 3 is operated by a signal from the airbag ECU 100, the gas ejected from the inflator 3 is supplied from the respective chamber portions 21 to 26 through the connecting passage 2A and the gas-supply passage 27. As a result, the respective chamber portions 21 to 26 are inflated and deployed between the head PfH, PrH of the respective occupants Pf, Pr and the respective side glasses 51 and 52 to protect the head PfH, PrH of the respective occupants Pf, Pr. The relation between the concrete collision form and CSA 2 deployment operation will be described later.

Expansion and Deployment of CSA

Next, the expansion and deployment operation of CSA 2 will be described. Hereinafter, the inflation and deployment operations at the time of the offset front collision and the side collision of the vehicle V will be individually described.

Expansion and Deployment Operation at Offset Front Collision

First, an inflation and deployment operation at the time of the offset front collision of the vehicle V will be described. FIG. 4 is an enlarged view of a main part (an enlarged view of a peripheral part of the shoulder belt anchor BA) showing CSA 2 and the shoulder belt SHB at the time of the offset-front collision of the vehicle V.

At the time of the offset front collision of the vehicle V, the occupant (front seat occupant) Pf of the front seat FS moves forward due to the inertial force thereof, and accordingly, the shoulder belt SHB is pulled toward the front of the vehicle as shown in FIG. 4. That is, the shoulder belt SHB is changed so that the extending direction starting from the position where the shoulder belt anchor BA is disposed is directed toward the front side in the horizontal direction. The distribution unit 8 is disposed in the vicinity of an arrangement position of the shoulder belt anchor BA on the front seat FS. Therefore, in the early stage of the offset front collision (the period in which the front seat occupant Pf is moving forward), the shoulder belt SHB whose extension direction is changed so as to be directed to the horizontal front side pushes up the position corresponding to the front side part of the distribution unit 8, which is the lower end edge of CSA 2, from the lower side toward the upper side (see arrow F in FIG. 4). That is, CSA 2 is pressed to narrow the lower opening 81, which is the front path 84 of the distribution unit 8 or the inlet part of the front path 84.

Therefore, at the initial stage of the offset front collision, the gas flows preferentially to the rear-side path 85 (see an arrow indicated by a solid line in FIG. 4), and the expansion and deployment completion time of the rear-seat lower sub-chamber portion 26 can be accelerated. As a characteristic behavior of the occupant P at the time of the offset-front collision of the vehicle V, there is a movement in which the head PrH of the occupant (rear-seat occupant) Pr on the rear-seat RS is directed toward the vehicle front and toward the vehicle width-direction outer side. In accordance with this behavior, it is required to accelerate the inflation and deployment completion time of the rear-seat lower sub-chamber portion 26. According to the present embodiment, by effectively utilizing the movement of the shoulder belt SHB, the inflation and deployment completion time of the rear-seat lower sub-chamber portion 26 at the time of the front-offset collision of the vehicle V can be accelerated.

When the attitude of the front seat occupant Pf returns to the original position, the force (the force F against CSA 2) from the shoulder belt SHB is released, and a sufficient amount of gas flows into the front-seat lower sub-chamber portion 24, and the front-seat lower sub-chamber portion 24 expands and deploys.

Expansion and Deployment Operation at Side Collision

Next, an expansion and deployment operation at the time of side collision of the vehicle V will be described. FIG. 3 is an enlarged view of a main part (an enlarged view of a peripheral part of the shoulder belt anchor BA) showing CSA 2 and the shoulder belt SHB at the time of side collision of the vehicle V.

Since the front seat occupant Pf does not move forward during the side collision of the vehicle V, the shoulder belt SHB does not push CSA 2 upward from the lower side. That is, there is no action of the shoulder belt SHB narrowing the front path 84 of the distribution unit 8 or the entrance of the front path 84. As described above, the opening area of the lower opening 81 is set larger than the opening area of the rear opening 82. Therefore, the gas flows sufficiently toward the front side path 84 (see the arrow in FIG. 3), and the inflation and deployment completion time of the front-seat lower sub-chamber portion 24 can be accelerated. As described above, the characteristic behavior of the occupant P at the time of the side collision of the vehicle V includes a movement in which the head PfH of the front seat occupant Pf is directed outward in the vehicle widthwise direction. In accordance with this behavior, it is required to accelerate the inflation and deployment completion time of the front-seat lower sub-chamber portion 24. According to the present embodiment, it is possible to accelerate the inflation and deployment completion time of the front-seat lower sub-chamber portion 24 at the time of the side collision of the vehicle V.

Effects of Embodiment

As described above, in the present embodiment, the distribution unit 8 is disposed in the vicinity of the position where the shoulder belt anchor BA is disposed in the front seat in the inflated and deployed condition of CSA 2. The distribution unit 8 has a front-side path 84 for supplying gas to the front-seat lower sub-chamber portion (front-seat occupant protection chamber portion) 24, and a rear-side path 85 for supplying gas to the rear-seat lower sub-chamber portion (rear-seat occupant protection chamber portion) 26. This makes it possible to make different forms of expansion and deployment of CSA 2 in each of the vehicles V by making use of the difference in the movement of the shoulder belt SHB in each of the side collision and the offset front collision. Accordingly, the front seat occupant Pf and the rear-seat occupant Pr can be favorably protected at the time of side collision and at the time of offset-front collision of the vehicles V, respectively, without improving the inflator 3.

Further, the entrance of the front path 84 in the distribution unit 8 is disposed on the front side and the lower side of the vehicle V than the position where the shoulder belt anchor BA is disposed. Therefore, it is possible to reliably obtain an operation of pressing CSA 2 so as to narrow the front path 84 or the entrance part of the front path 84 in the distribution unit 8 at the time of the offset-front collision of the vehicle V. This makes it possible to sufficiently advance the inflation and deployment completion time of the rear-seat lower sub-chamber portion 26 at the time of the offset front collision of the vehicle V.

Further, the entrance of the rear-side path 85 in the distribution unit 8 is disposed on the upper side and the rear side of the vehicle V with respect to the position where the shoulder belt anchor BA is disposed. Therefore, the entrance portion of the rear-side path 85 in the distribution unit 8 is not narrowed at the time of the offset front collision of the vehicle V. As a result, it is possible to reliably obtain a state in which the gas flows preferentially in the rear-side path 85, and it is possible to accelerate the time when the expansion and deployment of the rear-seat lower sub-chamber portion 26 is completed.

Other Embodiments

It should be noted that the present disclosure is not limited to the embodiment above, and all modifications and applications included in the scope of claims and a range equivalent to the scope of claims are possible.

For example, in the above embodiment, CSA device 1 mounted on the sedan-type vehicle V has been exemplified. The present disclosure is not limited thereto, and may be applied to CSA devices mounted on other types of vehicles.

The present disclosure is also applicable to CSA device 1 including CSA 2 without the front-seat lower sub-chamber portion 24 and the rear-seat lower sub-chamber portion 26.

The present disclosure is applicable to a curtain shield airbag device mounted on a vehicle.

What is claimed is:

1. A curtain shield airbag device comprising:
   an inflator; and
   a curtain shield airbag configured to be inflated and deployed in each of a side collision and an offset front collision of a vehicle, wherein the curtain shield airbag includes
      a plurality of chambers including a front seat occupant protection chamber configured to be located on a side of a front seat of the vehicle in an inflated and deployed state of the curtain shield airbag, and a rear seat occupant protection chamber configured to be located on a side of a rear seat of the vehicle in the inflated and deployed state, and
      a plurality of non-expansion parts that are not expanded in the inflated and deployed state and that define the plurality of chambers; and
   a distribution unit configured to distribute a gas supplied from the inflator to the front seat occupant protection chamber and to the rear seat occupant protection chamber, wherein
   the distribution unit comprises:
      a first non-expansion part, a second non-expansion part, and a third non-expansion part that are included in the plurality of non-expansion parts, the first non-expansion part being inclined upward toward a rear side of the vehicle, the second non-expansion part being positioned on the rear side of the vehicle with respect to the first non-expansion part, the third non-expansion part being positioned on an upper side of the vehicle with respect to the second non-expansion part;
      a first opening; and
      a second opening,
   the first opening is defined by an end of the first non-expansion part and an end of the second non-expansion part, the first opening communicating with the front seat occupant protection chamber,
   the second opening is defined by the end of the second non-expansion part and an end of the third non-expansion part, the second opening communicating with the rear seat occupant protection chamber, and
   the end of the second non-expansion part is aligned with a belt insertion hole of a shoulder belt anchor for the front seat in a vertical direction with respect to a bottom of the vehicle when viewed from a longitudinal side of the vehicle, and the second opening is positioned on the upper side and the rear side of the vehicle with respect to the belt insertion hole, in the inflated and deployed state.

2. The curtain shield airbag device according to claim 1, wherein the front seat occupant protection chamber is located on a front side and a lower side of the vehicle with respect to the distribution unit, and the rear seat occupant protection chamber is located on the rear side and the lower side of the vehicle with respect to the distribution unit.

3. The curtain shield airbag device according to claim 1, wherein an area of the first opening is greater than an area of the second opening in the inflated and deployed state.

4. The curtain shield airbag device according to claim 1, wherein the front seat occupant protection chamber and the rear seat occupant protection chamber are positioned below a beltline of a front side door of the vehicle in the inflated and deployed state.

5. The curtain shield airbag device according to claim 1, wherein the end of the second non-expansion part covers the belt insertion hole in the inflated and deployed state.

6. The curtain shield airbag device according to claim 1, wherein the end of the second non-expansion part overlaps the belt insertion hole in the inflated and deployed state.

7. The curtain shield airbag device according to claim 1, wherein the curtain shield airbag device further comprises a plurality of fixing tabs fixed to a roof side rail of the vehicle, and
   the plurality of fixing tabs are present on both sides of the inflator.

8. The curtain shield airbag device according to claim 7, wherein
   the plurality of fixing tabs includes five fixing tabs, and
   three of the five fixing tabs are present on a first side of the inflator and two of the five fixing tabs are present on a second side of the inflator.

9. The curtain shield airbag device according to claim 8, wherein
   the first side is a front side of the vehicle with respect to the inflator, and
   the second side is the rear side of the vehicle with respect to the inflator.

* * * * *